March 18, 1924.
W. A. RIDEOUT
EXTENSION LEVER
Filed June 28, 1923
1,487,604
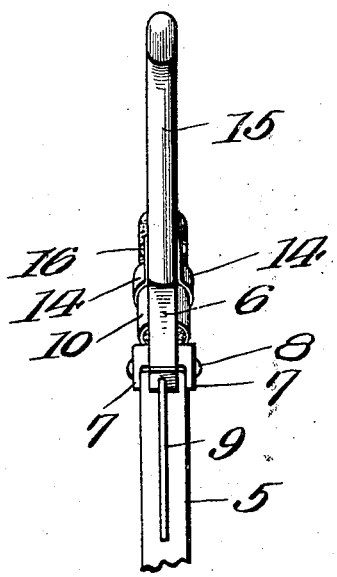
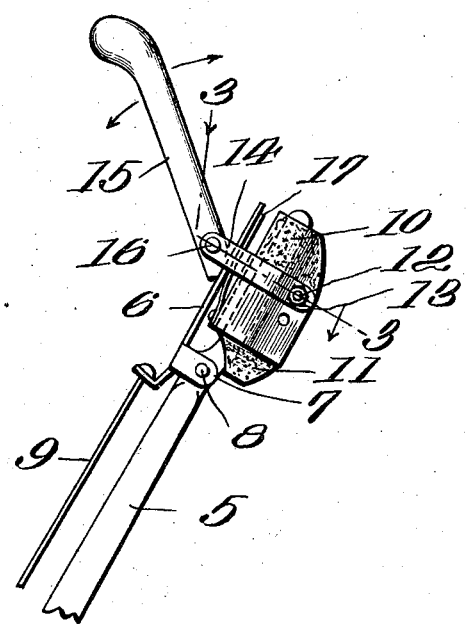
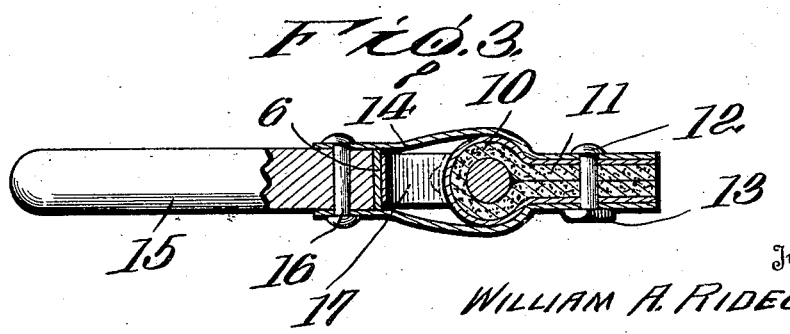
Inventor
WILLIAM A. RIDEOUT Patented Mar. 18, 1924.

1,487,604

UNITED STATES PATENT OFFICE.

WILLIAM A. RIDEOUT, OF OSHKOSH, WISCONSIN.

EXTENSION LEVER.

Application filed June 28, 1923. Serial No. 648,249.

*To all whom it may concern:*

Be it known that I, WILLIAM A. RIDEOUT, a citizen of the United States, and resident of Oshkosh, county of Winnebago and State of Wisconsin, have invented new and useful Improvements in Extension Levers, of which the following is a specification.

This invention relates to an improvement in an extension lever adapted for use more particularly in connection with the emergency brake and clutch releasing levers of the Ford car.

The levers of the Ford car type extend when in released position to a position where it is inconvenient to reach without leaning forward, and thereby making it difficult for a large or fleshy person to reach and operate.

With the present invention this objection is overcome, and the lever may be moved in either direction by the extension lever applied thereto without any of the inconveniences that exist when the lever is not provided with an extension.

The invention consists of certain novel features of construction and combinations of parts which will be hereinafter described and pointed out in the claims.

In the accompanying drawings,

Figure 1, is a view in rear elevation showing the invention applied to the brake and clutch lever;

Figure 2, is a view in side elevation; and

Figure 3, is a cross-sectional view on line 3—3 of Figure 2.

The main or control lever 5 is provided with a grip lever 6, pivotally connected thereto by two ears 7, 7, formed on the grip lever 6 and engaging the sides of the lever 5. The ears 7 are connected to the lever 5 by a pin 8. A pawl retracting rod 9 is connected to the lower end of the grip lever 6.

A metal sleeve 10 is lined with a strip of leather 11, and the edges of the sleeve and leather are fastened together by means of a bolt 12 and nut 13. The sleeve 10 is adapted to be slipped over the end of the lever 5, and the leather acts as a cushion and eliminates any rattling of the sleeve on the lever 5. Connected to the sleeve 10, on each side thereof, by the bolt 12 are metal straps 14. The straps conform to the shape of the sleeve and are rigidly held thereto.

The straps 14 project rearwardly beyond the grip lever 6, and received between the ends of the strap is a rearwardly extending lever 15, which is pivotally connected thereto by a pin 16. The lever 15 extends upwardly and at somewhat of an acute angle from the lever 5. The lower end of the lever 15 normally engages the grip lever 6, which is held away from the lever 5 by means of a spring 17 carried by the sleeve 10.

The sleeve 10 and lever 15 may be readily applied to a lever, such as the control lever 5, by simply slipping the sleeve over the upper end of the lever, and causing the extension lever 15 to be brought into engagement with the grip lever 6, when the device is ready for use, and the control lever capable of operation without the necessity of grasping it by the hand of the operator.

In the use of the extension lever 14 for operating the control lever 5, the lever 13 may be forced downwardly, causing the lower end thereof to engage and force the grip lever 6 toward the lever 5, thereby actuating the pawl retracting rod 9. Upon the actuation of the rod 9, the lever 5 is free to be moved in either a forward or rearward direction, and by pushing the lever 14 forward the lever 5 is moved in the same direction, but upon pulling the lever 14 rearwardly the lever will be drawn in a like direction.

However, should it be found more convenient to operate the lever 5, by pushing the lever 15 upwardly, this may be done, thereby causing the lever 15 to press against the upper portion of the grip lever 6 and forcing it toward the lever 5 to release the lever 5, when lever 5 may be moved in either direction by forcing lever 15 in the direction in which it is desired to have the lever 5 travel.

From the foregoing it will be evident with this extension lever it may be readily applied or removed, by either slipping the sleeve 10 on or off of the lever 5, and that the straps 14 insure against any possible rotary movement as they are located so that the grip lever 6 is located between them. The leather, or other suitable, lining 11 insures of a snug fit between the lever 5 and sleeve 10, and the possibility of rattling of the parts is practically eliminated.

Having described my invention what I claim, is:—

1. The combination with a control lever having a grip lever, of a sleeve mounted on the control lever, straps connected to the sleeve, and an extension lever pivotally connected to the straps and adapted to be operated for actuating the grip and control levers.

2. The combination with a control lever and a grip lever, of an extension lever pivotally mounted on the control lever and capable of being moved in two directions for releasing the grip lever on either movement thereof and operating the grip and control levers.

WILLIAM A. RIDEOUT.